United States Patent
Kim

(10) Patent No.: US 8,520,166 B2
(45) Date of Patent: Aug. 27, 2013

(54) BACKLIGHT UNIT AND LIQUID CRYSTAL DISPLAY DEVICE HAVING THE SAME

(75) Inventor: Byoung-Chul Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 812 days.

(21) Appl. No.: 11/385,892

(22) Filed: Mar. 22, 2006

(65) Prior Publication Data

US 2007/0001569 A1    Jan. 4, 2007

(30) Foreign Application Priority Data

Jun. 30, 2005  (KR) .................. 10-2005-0058561

(51) Int. Cl.
*G02F 1/1335*  (2006.01)

(52) U.S. Cl.
USPC .......................................................... 349/69

(58) Field of Classification Search
USPC .......................................................... 349/69
See application file for complete search history.

(56) References Cited

U.S. PATENT DOCUMENTS

| | | | | |
|---|---|---|---|---|
| 5,550,658 A * | 8/1996 | Yoshihiro | | 349/62 |
| 5,567,042 A * | 10/1996 | Farchmin et al. | | 362/241 |
| 6,491,411 B2 * | 12/2002 | Itoh | | 362/246 |
| 6,626,562 B2 * | 9/2003 | Blanchard | | 362/346 |
| 7,080,933 B2 * | 7/2006 | Chen et al. | | 362/616 |
| 7,250,994 B2 * | 7/2007 | Nishi | | 349/113 |
| 2002/0097354 A1 * | 7/2002 | Greiner | | 349/61 |
| 2003/0095407 A1 * | 5/2003 | Yao | | 362/241 |
| 2004/0008512 A1 * | 1/2004 | Kim | | 362/235 |
| 2004/0218388 A1 * | 11/2004 | Suzuki | | 362/231 |
| 2005/0001537 A1 | 1/2005 | West et al. | | |
| 2006/0066773 A1 * | 3/2006 | Huang | | 349/64 |

FOREIGN PATENT DOCUMENTS

| | | |
|---|---|---|
| CN | 1213785 A | 4/1999 |
| CN | 2694315 | 4/2005 |
| EP | 0 971 258 A2 | 12/2000 |
| JP | 58162185 U | 10/1983 |
| JP | 455086 U | 5/1992 |
| JP | 04188680 A | 7/1992 |
| JP | 2003505835 T | 2/2003 |
| JP | 2003332630 A | 11/2003 |
| JP | 2004311353 A | 11/2004 |
| KR | 10-2004-0086604 | 10/2004 |
| WO | WO0107828 A1 | 2/2001 |

OTHER PUBLICATIONS

Office Action in JP-2006-181473 dated Jun. 23, 2009 from the Japanese Patent Office.
German Office Action (Application No. 10-2006-029000.3), dated Jun. 11, 2013.

* cited by examiner

*Primary Examiner* — Uyen Chau N Le
*Assistant Examiner* — Hoang Tran
(74) *Attorney, Agent, or Firm* — Morgan, Lewis & Bockius LLP

(57) ABSTRACT

A backlight unit for a liquid crystal display device includes one or more light emitting devices emitting a plurality of monochromatic light to a liquid crystal display panel, and first and second reflectors respectively attached on first and second surfaces of the light emitting devices to reflect the light emitted from the light emitting device to a lateral surface of the light emitting devices, the first surface facing the liquid crystal display panel and the second surface facing a direction opposite to the liquid crystal display panel.

10 Claims, 5 Drawing Sheets

BACKLIGHT UNIT AND LIQUID CRYSTAL DISPLAY DEVICE HAVING THE SAME

This application claims the benefit of the Korean Patent Application No. 58561/2005, filed on Jun. 30, 2005, which is hereby incorporated by reference in its entirety.

BACKGROUND OF THE INVENTION

1. Field of the Invention

The present invention relates to a liquid display device, and particularly, to a backlight unit and a liquid crystal display device having the same that minimize image quality degradation when light emitting devices are employed as a backlight lamp in the liquid crystal display device.

2. Background of the Invention

Various portable electronic devices, such as mobile phones, personal digital assistants (PDA), notebook computers, etc., have been continuously developed. As such, there is a demand in developing flat panel display devices, such as liquid crystal displays (LCDs), plasma display panels (PDPs), field emission displays (FEDs), and vacuum florescent displays (VFDs) to provide necessary characteristics such as compact construction, light weight, and low power consumption. Among these flat panel devices, LCDs are extensively used due to the ease with which they are driven and their superior ability to display images.

An LCD device displays images on a screen by adjusting an amount of light being transmitted through a liquid crystal layer using refractive anisotropy. In order to display images in the LCD device, a back light (i.e., light source) is required to supply light to a liquid crystal layer of the LCD device. In general, the backlight may be divided into two types depending upon the light source (or lamp) location, namely, a lateral (side or edge) type backlight and a direct type backlight.

In the lateral type backlight, a lamp is disposed at a lateral side of the LCD panel to supply light to the liquid crystal layer, while in the direct type backlight, the lamp is disposed at a lower portion of the LCD panel to directly supply light to the liquid crystal layer. Also, the lateral type backlight is disposed at the lateral side (or edge) of the LCD panel to supply light to the liquid crystal layer through the use of a reflector and a light guide plate. Hence, the lateral type backlight can be employed in notebook computers or the like which requires thin display devices.

However, because the lamp is disposed at the lateral side of the LCD panel, it is difficult to employ a lateral side backlight to a large sized LCD panel. Moreover, it is difficult to obtain high level brightness because the light is supplied through the light guide plate. Thus, the lateral type backlight cannot be applied to an LCD panel for a large size LCD TV.

On the contrary, the direct type backlight can be applied to large LCD panels because light is directly supplied from the lamp to the liquid crystal layer, thereby obtaining high level brightness. Thus, the direct type backlight can be used for LCD TVs.

For a backlight lamp, a light emitting device that spontaneously emits light, such as a light emitting diode (LED) can be used instead of a fluorescent lamp. Such a light emitting device emits R, G and B monochromatic (i.e., single color) light. Accordingly, upon using such light emitting devices as a backlight, a high color reproduction rate can be advantageously obtained with a minimal driving (operation) power.

FIG. 1 illustrates a structure of the related art LCD device employing light emitting devices as a backlight lamp. As shown in FIG. 1, an LCD device 1 includes an LCD panel 3 and a backlight 10 installed at a rear surface of the LCD panel 3. Images can be displayed on the LCD panel 3, which includes a lower substrate 3a and an upper substrate 3b that are both made of a transparent material, such as glass, and a liquid crystal layer (not shown) interposed therebetween. Particularly, although not shown in the drawing, the lower substrate 3a is often referred to as a thin film transistor (TFT) substrate because driving devices such as thin film transistors and pixel electrodes are formed thereon. The upper substrate 3b is often referred to as be a color filter substrate because a color filter layer is formed thereon. A driving circuit unit 5 is provided at a lateral (side or edge) surface of the lower substrate 3a to apply electronic signals to the thin film transistors and the pixel electrodes formed on the lower substrate 3a.

Further, the backlight 10 includes a plurality of light emitting devices 11, installed at a lower lateral (side or edge) surface of the LCD panel 3, that emit and provide light to the LCD panel 3, a light guide plate 15 to guide the light emitted from each of the light emitting devices 11 to the LCD panel 3, and a reflector 17 to reflect the light emitted from each of the light emitting devices 11, to thereby improve luminance efficiency.

In addition, a diffusion plate (not shown) can be provided at an upper portion of the light guide plate 15 to diffuse the light and to provide a uniform distribution of the light to the LCD panel 3.

The light emitting devices 11, which are R, G, and B light emitting devices to emit the R, G and B monochromic light, are provided in plurality at a lateral (side or edge) location of the backlight 10 with certain intervals between each light emitting device 11. The plurality of light emitting devices 11 are aligned in two or more lines (i.e., two or more rows or columns). R, G, and B monochromic (single color) light is respectively emitted from each of the R, G and B light emitting devices. Each of the R, G and B monochromic light is mixed (combined) together to form so-called white light, and thereafter the white light is supplied to the LCD panel 3 via the light guide plate 15.

However, the related art backlight having the above-described structure may have the following problems. As illustrated in FIG. 2, the light emitting devices 11 are arranged in multiple lines (e.g., only two lines shown in FIG. 2 for simplicity) at the lateral (side or edge) wall 12 of the backlight 10. Here, the R, G and B light emitting devices are mounted in sequential order. Each of the R, G and B monochromic (single color) light emitted from each of the light emitting devices 11 is directed to be incident directly onto the light guide plate 15 or upon being reflected by the reflector 17 at the lower portion thereof.

When the monochromic light emitted from each of the R, G and B light emitting devices 11 is reflected by the reflector 17, an intensity of the monochromic light particularly reflected at a portion near or adjacent to each light emitting device 11 is greater than that of other emitted or reflected light. Accordingly, all the monochromic light provided to the LCD panel 3 is not completely converted into white light due to the differences in the intensities of each type of monochromic light (i.e. R, G, B light being provided directly to and reflected to the LCD panel 3), which ultimately causes undesirable degradation in the quality of images shown on the LCD panel 3.

SUMMARY OF THE INVENTION

Accordingly, the present invention is directed to a backlight unit and a liquid crystal display device having the same that substantially obviate one or more problems due to limitations and disadvantages of the related art.

An object of embodiments of the present invention is to provide a backlight unit and a liquid crystal display device having the same that supply uniformly mixed white light to an LCD panel by disposing a side-emission light emitting device which scatters and emits light towards the LCD panel.

Another object of embodiments of the present invention is to provide a backlight unit and a liquid crystal display device having the same that minimize the amount of R, G and B monochromic light from being supplied to an LCD panel without being properly mixed into white light.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of embodiment of the present invention, as embodied and broadly described, a backlight unit for a liquid crystal display device includes a plurality of light emitting devices emitting light and a reflector disposed below the light emitting devices to reflect the light towards a liquid crystal panel, the reflector having grooves with side walls having an inclined angle.

In another aspect of an embodiment, a liquid crystal display device includes a liquid crystal display panel, a plurality of light emitting devices to supply light to the liquid crystal display panel from a lateral surface of the light emitting devices, and a reflector disposed below each light emitting device, and inclined at a lower surface of each light emitting device to reflect the light emitted from each light emitting device to the LCD panel.

In another aspect of an embodiment, a backlight unit for a liquid crystal display device includes one or more light emitting devices emitting a plurality of monochromatic light to a liquid crystal display panel and first and second reflectors respectively attached on first and second surfaces of the light emitting devices to reflect the light emitted from the light emitting device to a lateral surface of the light emitting devices, the first surface facing the liquid crystal display panel and the second surface facing a direction opposite to the liquid crystal display panel.

In a further aspect of an embodiment, a liquid crystal display device includes a liquid crystal display panel having a first and second substrates, one or more light emitting devices emitting a plurality of monochromatic light to the liquid crystal display panel, and first and second reflectors respectively attached on first and second surfaces of the light emitting devices to reflect the light emitted from the light emitting device to a lateral surface of the light emitting devices, the first surface facing the liquid crystal display panel and the second surface facing a direction opposite to the liquid crystal display panel.

It is to be understood that both the foregoing general description and the following detailed description are exemplary and explanatory and are intended to provide further explanation of the present invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to preferred embodiments of the present invention, examples of which are illustrated in the accompanying drawings.

Figure 3:
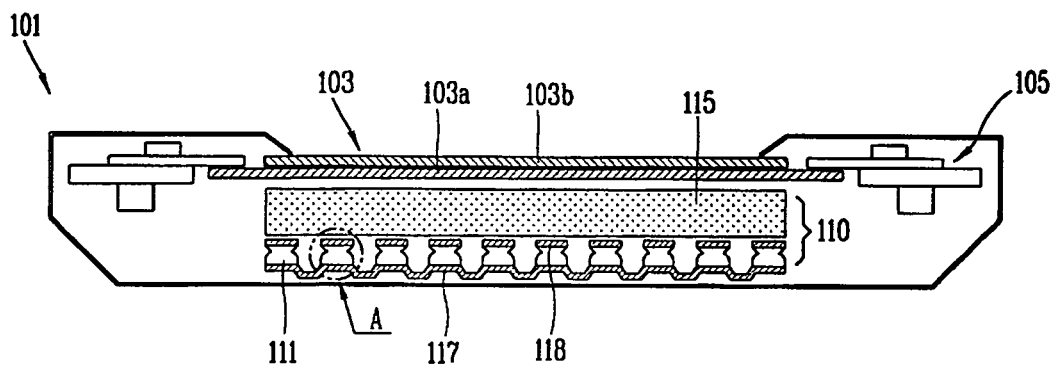
FIG. 3 is a schematic view showing an exemplary structure of a liquid crystal display device having a backlight unit according to an embodiment of the present invention.

FIG. 3 is a schematic view showing an exemplary backlight unit of a liquid crystal display device according an embodiment of the present invention. As shown in FIG. 3, a liquid crystal display device 101 includes a liquid crystal display (LCD) panel 103 and a backlight unit 110 to supply light thereto. The LCD panel 103 may include a lower substrate 103a and an upper substrate 103b, both made of a transparent material, such as glass, and including a liquid crystal layer (not shown) interposed therebetween. The lower substrate 103a may be referred to as a thin film transistor (TFT) substrate because thin film transistors and pixel electrodes are formed thereon. The upper substrate 103b may be referred to as a color filter substrate because a color filter layer is formed thereon. A driving circuit unit 105 can be provided at a lateral (side or edge) surface of the lower substrate 103a to apply appropriate signals to each thin film transistor and each pixel electrode formed on the lower substrate 103a.

The backlight unit 110, which can be mounted (or otherwise attached or provided) underneath (or below or at a lower portion of) the LCD panel 103 to supply light thereto, may include a plurality of light emitting devices 111 (such as light emitting diodes) disposed underneath the LCD panel 103, a light guide plate 115 appropriately installed between the light emitting devices 111 and the LCD panel 103 to guide light towards the LCD panel 103. Also, a reflector 117 may be appropriately installed underneath (or below or at a lower portion of) each light emitting device 111 to reflect light emitted from each light emitting device 111 toward the LCD panel 103, resulting in improved luminance efficiency.

Although not shown in the drawing, various optical members such as a diffusion plate and a diffusing sheet to diffuse light at an upper portion of the light guide plate 115 and to allow a uniform distribution of light to the LCD panel 103 may be further included in the backlight 110 unit.

Figure 1:
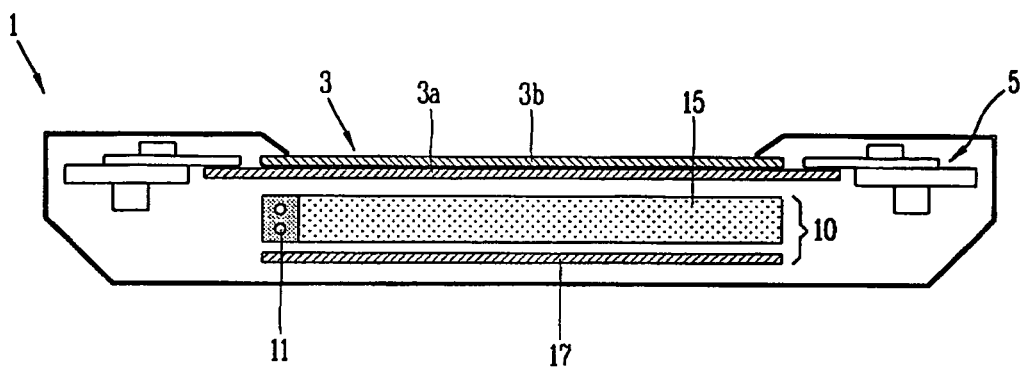
FIG. 1 is a schematic view showing a structure of the related art liquid crystal display device.
Figure 2:
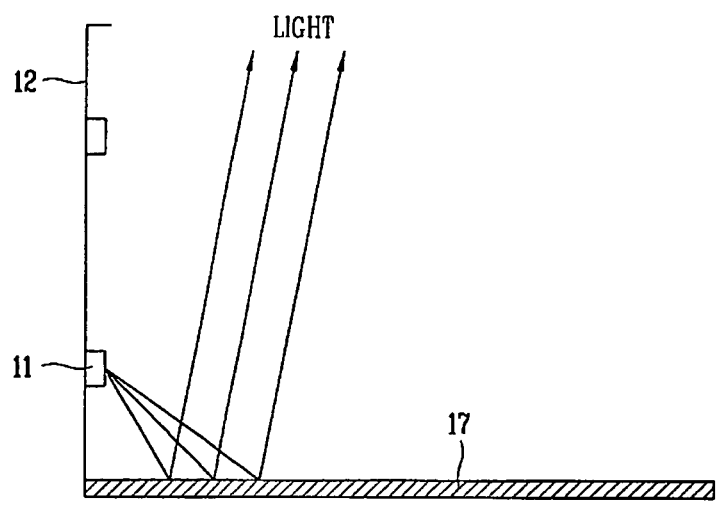
FIG. 2 is a partially enlarged schematic view showing a reflection of light from a backlight having light emitting devices at a lateral surface thereof according to the related art.

A plurality of light emitting devices 111 can be disposed underneath of the LCD panel 103 to emit R, G, and B monochromic (single color) light. Unlike the related art backlight structure as shown in FIG. 1 in which the light emitting devices are installed at the lateral (side or edge) portion of the backlight assembly, the light emitting devices 111 are arranged underneath (or below or at the lower portion of) the LCD panel 103 in an embodiment of the present invention. In other words, lateral-type light emitting devices are installed in the related art backlight, whereas direct-type light emitting devices 111 are arranged in the backlight unit according to an embodiment of the present invention.

Figure 4:
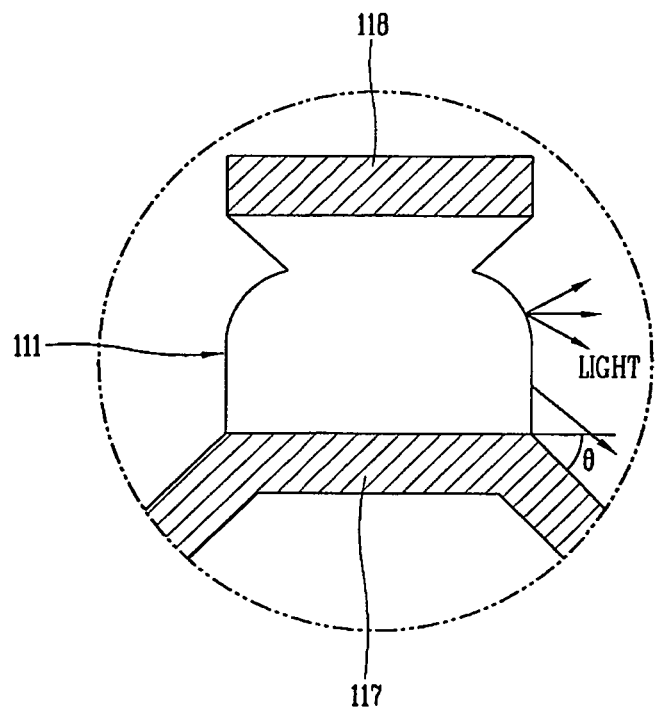
FIG. 4 is an enlarged view of a region A of FIG. 3.

The light emitting device 111 of an embodiment of the present invention can be considered as a side-emission light emitting device. As shown in FIG. 4, each light emitting device 111 may be formed to have curved shapes (portions or regions) to allow certain side surface portions thereof to have a particular curvature. Accordingly, when the R, G and B monochromic light is emitted from each light emitting device 111, the light is scattered at the surfaces having such a curvature. Thus, since the R, G and B monochromic light is emitted from the side surfaces of each light emitting device 111, the light emitting device 111 of the present invention can be referred to as a (direct-type) side-emission light emitting device.

Figure 5:
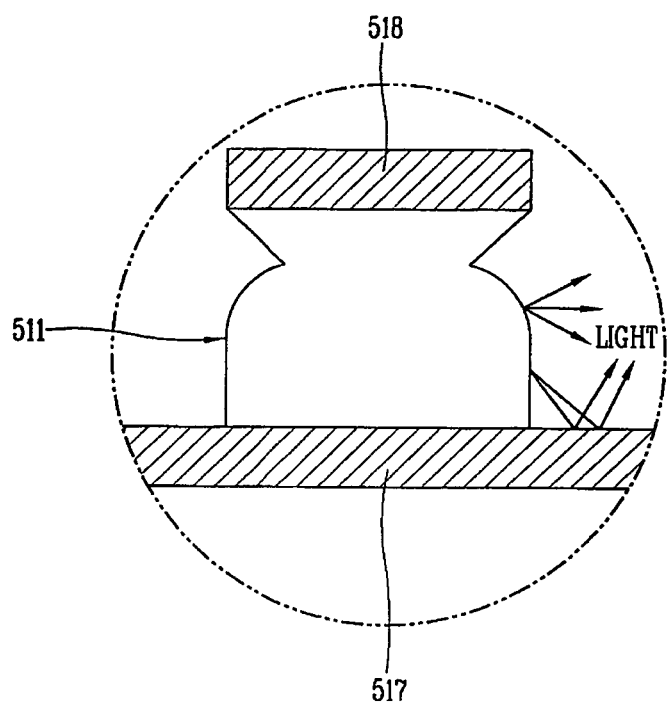
FIG. 5 is a view showing a reflection of R, G and B monochromic light at a reflector adjacent to a light emitting device when the reflector is formed in a parallel manner.
Figure 6:
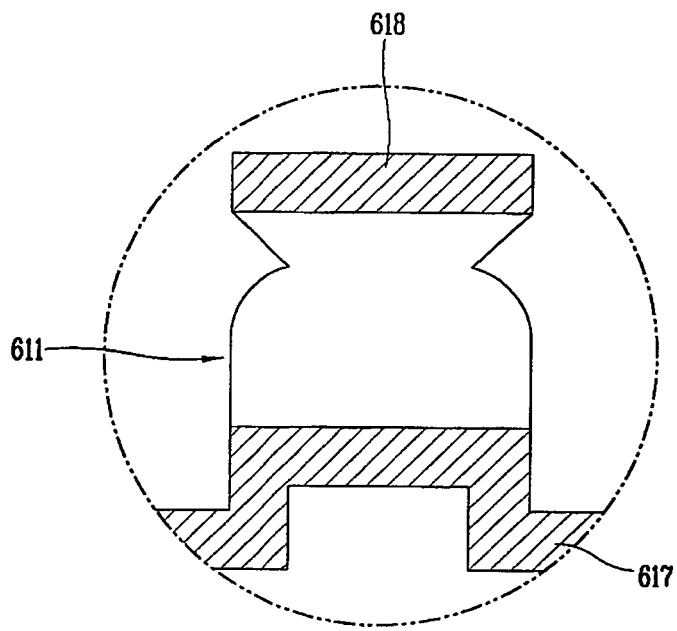
FIG. 6 is a view showing a backlight unit structure according to another embodiment of the present invention.

One or more direct-type light emitting devices 111 according to an embodiment of the present invention has a specifically shaped profile or cross-section, which substantially improves the way that light is emitted from the light emitting device 111. As can be explained with reference to FIGS. 3 to 6, the specifically shaped profile or cross-section of the light emitting device 111 can have opposing inwardly pinched portions (i.e., grooves with at least one concave curved wall). As such, the overall shape resembles a cross-section of a typical loaf of bread or slice of toast. Additionally, one or more reflectors 117, 118 (which will be described in more detail hereafter), that also have particular shapes (as shown in FIGS. 4, 5, and 6) may be additionally attached or otherwise provided at (or adjacent to) one or more light emitting devices 111 to further improve light emission efficiency.

As shown in FIG. 4, a reflecting body 118 may be formed at (or attached to) an upper surface of one or more side-emission light emitting device 111. In order to minimize the amount of light being emitted to portions other than the curved side surfaces of the light emitting device 111 (such as to the flat top surface of the light emitting device 111), the reflecting body 118 reflects all R, G and B monochromic (single color) light that may be emitted towards the upper surface of the light emitting device 111, to thus scatter and emit such light back towards the side surfaces thereof.

Hence, because all of the R, G and B monochromic light are emitted from the side surfaces of the light emitting device 111 according to an embodiment of the present invention, each of the emitted R, G and B monochromic light can be more easily mixed together (combined) as compared to that of the related art light emitting device structure. As a result, white light can be supplied more to the LCD panel 103 than that of the related art backlight structure.

Additionally, a reflector 117 may be formed underneath (or below or at the lower surface of) one or more light emitting devices 111. The reflector 117 can have a shape that further reflects the R, G and B monochromic light emitted from each light emitting device 111 towards the light guide plate 115, thereby to additionally improve luminance efficiency of the LCD panel 103. As shown in FIG. 4, the reflector 117 can be formed to have inclined portions that form an angle θ with respect to the lower surface of the light emitting device 111. Referring back to FIG. 3, the inclined portions of the reflector 117 may be formed underneath (or below) all light emitting devices 111. Accordingly, the reflector 117 may have a zig-zagged or corrugated cross-section when viewed from its profile.

Thus, the corrugated reflector 117 can have inclined portions at angles with respect to the lower surface of the light emitting device 111 or in an incident surface of the LCD panel 103 onto which light is directed to be incident. This feature can minimize the amount of R, G and B light that is reflected (from portions near each light emitting device 111) directly toward and directed to be incident to the LCD panel 103 without being properly mixed (combined) to form white light.

In other words, the corrugated reflector 117 has peaks and valleys, and each light emitting device 111 is located at the peaks. With respect to one peak, the opposing walls of two adjacent valleys (i.e., the opposing sides of two adjacent grooves) slope downward away from the peak. Namely, the walls of the grooves are formed at particular angles to allow improved reflection of light being emitted from the light emitting device 111. Thus, some of the light emitted from one light emitting device 111 travel into the grooves and is reflected at the angled portions thereof. Such corrugated reflector 117 results in improved luminance performance when compared to the related art reflector 17 of FIG. 1.

FIG. 5 shows an example of a reflector 517 that has a parallel, flat or plate-like shape which corresponds to the lower surface of each light emitting device 511 or which is incident to the surface of the LCD panel 103. By using such a flat reflector 517, each R, G and B monochromic light reflected from the portions adjacent to each light emitting device 511 can have stronger intensity than that of the corrugated reflector 117 in FIG. 4. Accordingly, upon mixing (combining) each R, G and B monochromic light with other R, G and B monochromic light, the amount of white light that is formed may not optimal, and such non-optimal white light (and/or R, G, B monochromic light that have not been properly combined) is directly supplied to the LCD panel 103. That is because the intensity of the reflected R, G and B monochromic light becomes weaker than that of the related art backlight having lateral-type light emitting devices (as shown in FIG. 1). Thus, the R, G and B monochromic light provided (reflected) in an embodiment of the present invention allows improved mixing (combining), thereby to allow more advantageous formation of white light. However, even if the flat reflector 517 is mounted to be substantially parallel to the lower surface of each light emitting device 111 or parallel to the incident surface of the LCD panel 103, the R, G and B monochromic light or light having a particular color (both having a constant intensity) other than the white light may still be undesirably made incident onto the LCD panel 103.

Referring back to FIG. 4, because the corrugated reflector 117 has grooves with certain angled portions, the R, G and B monochromic light, which is emitted from one light emitting device 111 toward the reflector 117, may not be immediately reflected as in the case of a flat reflector 517. The R, G and B monochromic light from one light emitting device 111 ultimately gets reflected by opposing inclined portions of adjacent grooves next to adjacent light emitting devices 111 of the corrugated reflector 117. However, the intensity of the R, G and B monochromic light is weak enough to allow more proper mixing (combining) with other monochromic light. As such, the R, G and B monochromic light can be properly combined into white light and supplied to the LCD panel 103 more effectively.

As explained above, an embodiment of the present invention, by employing a corrugated reflector 117 having grooves with walls inclined at an angle θ, the R, G and B monochromic light emitted from each light emitting device 111 can be improved. Hence, the inclined angle θ of the reflector 117 can be formed to have any appropriate angle as long as the R, G and B monochromic light emitted from each light emitting device 111 is reflected in an improved manner.

However, the reflector in the backlight unit 110 according to an embodiment of the present invention does not have to be formed with inclined sloped (grooves) as described above with reference to FIG. 4. As shown in FIG. 6, a corrugated reflector 617 having stepped portions may be provided underneath (or below) one or more light emitting devices 611. In such a case, the stepped reflector 617 may be positioned underneath (below) the light emitting devices 611 in direct contact with (as shown in FIG. 6) or to have a gap (distance) therebetween. In such a structure, the rate in which the R, G and B monochromic light emitted from the backlight 110 that is reflected by the stepped reflector 617 is decreased, and thus the intensity of the light becomes weaker than that of the related art. Accordingly, the R, G and B monochromic light can be mixed (combined) in an improved manner and thus supplied to the LCD panel 103 as the white light more efficiently.

Figure 7A:
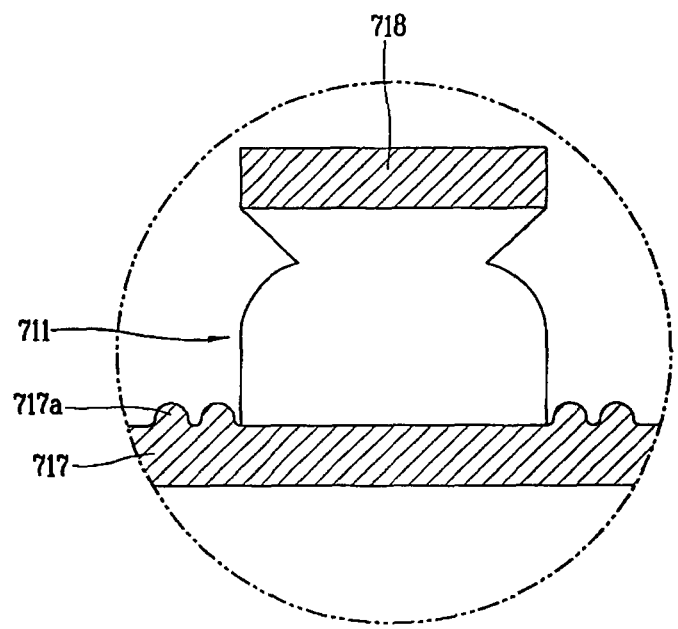
FIGS. 7A and 7B show another embodiment of the present invention.
Figure 7B:
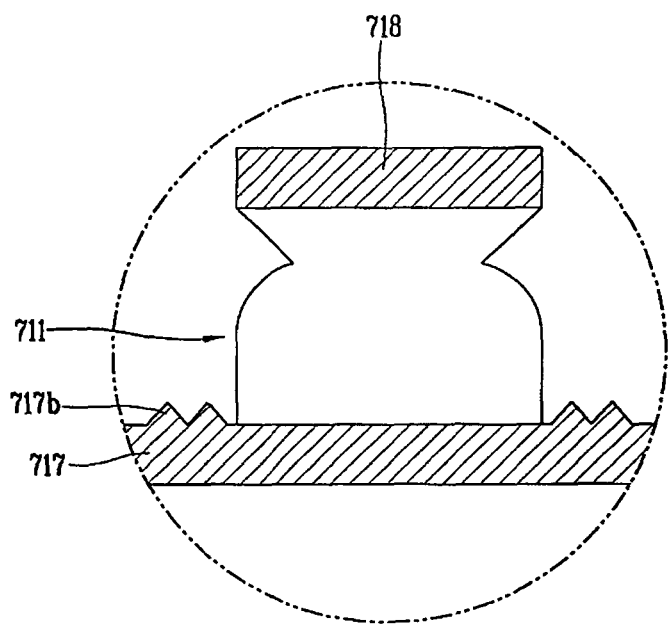

FIGS. 7A and 7B show another embodiment of present invention. As shown in FIGS. 7A and 7B, a plurality of protrusions 717a and 717b are formed on the surface of the reflector 717 near the light emitting device 711. The monochromic light emitted from the light emitting device 711 is scattered by the protrusions 717a and 717b to be mixed with other monochromic light emitted from the other light emitting devices. As a result, the resultant white light can be provided with the liquid crystal display panel. The protrusions 717a and 717b may be formed integrally with the reflector 717 as a single body. In other words, the protrusions 717a and 717b are formed of the same reflective material as the reflector 717. Further, the protrusions 717a and 717b may be formed independently from the reflector 717. That is, the reflective protrusions 717a and 717b are attached onto the reflector 717.

The protrusions 717a and 717b are disposed at the region where the monochromic light emitted from the light emitting device 711 and reflected by the reflector 717 is not mixed with the light from the neighboring light emitting devices 711. Thus, the region which the protrusions 717a and 717b are disposed may be dependent upon the gap between the neighboring light emitting devices 711 and the distance between the reflector 717 and the liquid crystal display panel. Although the protrusions 717a and 717b may be formed in the shapes of the FIGS. 7A and 7B, for example, they may be formed in various shapes as long as they function to produce uniform white light.

Figure 8:
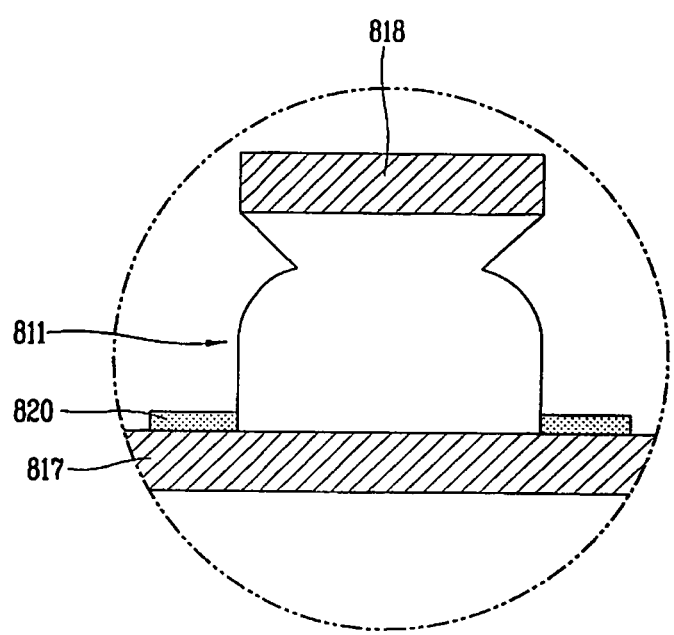
FIG. 8 is a view showing yet another embodiment of the present invention.

FIG. 8 is a view showing yet another embodiment of the present invention. In this embodiment, a scattering member 820 is disposed at the region near the light emitting device 811 where the monochromic light emitted from the light emitting device 811 and reflected by the reflector 817 is not properly mixed with the light from the neighboring light emitting devices 811. The monochromic light from the light emitting device 811 is scattered by the scattering member 820 to be mixed with other monochromic light from the other light emitting devices. By such a scattering member, the monochromic light is mixed with the monochromic light from the other light emitting devices, thereby providing the white light with the liquid crystal device. Although the scattering member 820 is flat on the reflector 817 as shown in FIG. 8, a shape of the scattering member 820 is not limited to this particular shape. For example, the scattering protrusion having various shapes may be used in this embodiment to scatter the monochromic light.

As described above, concerning the backlight unit of embodiments of the present invention, a plurality of side-emission type light emitting devices are provided underneath (below) the LCD panel and a corrugated reflector (such as 117, 617) with appropriate grooves (i.e., peaks and valleys) and the scattering member may be provided underneath (below) the light emitting devices, so as to improve the reflection of the R, G and B monochromic light from being emitted from the light emitting devices. Therefore, more efficiently generated white light can be supplied to the LCD panel, which thus results in minimal degradation in the quality of images being displayed on the LCD panel.

It will be apparent to those skilled in the art that various modifications and variations can be made in the backlight unit and the liquid crystal display device having the same of the present invention without departing from the spirit or scope of the invention. Thus, it is intended that the present invention covers the modifications and variations of this invention provided they come within the scope of the appended claims and their equivalents.

What is claimed is:

1. A backlight unit for a liquid crystal display device, comprising:
   a plurality of light emitting devices emitting light; and
   a reflector disposed below the light emitting devices to reflect the light from the light emitting devices towards a liquid crystal panel disposed at the upper portion of the light emitting devices, the reflector including a first portion under the light emitting device, a second portion outside of the first portion, and a third portion outside of the second portion,
   wherein the first portion of the reflector has a flat surface, the second portion of the reflector is inclined to the third portion from the first portion at a predetermined angle, and the third portion of the reflector has a flat surface parallel to the surface of the first portion,
   wherein the third portion is disposed under the first portion so that the second portion is inclined in the lower direction from the first portion to the third portion.

2. The backlight unit of claim 1, wherein the light emitting devices include a light emitting diode.

3. The backlight unit of claim 1, wherein the light emitting devices are side-emission type light emitting devices.

4. The backlight unit of claim 1, further comprising a reflecting body disposed above each light emitting device to reflect light emitted towards a top surface of the light emitting device.

5. The backlight unit of claim 1, further comprising a light guide plate above the light emitting devices to guide the light emitted from each light emitting device towards the liquid crystal display panel.

6. The backlight of claim 5, further comprising at least one optical member above the light guide plate to improve optical characteristics of the light guided by the light guide plate.

7. A liquid crystal display device comprising:
   a liquid crystal display panel;
   a plurality of light emitting devices to supply light to the liquid crystal display panel from a lateral surface of the light emitting devices; and
   a reflector disposed below each light emitting device, and inclined at a lower surface of each light emitting device to reflect the light emitted from each light emitting device to the LCD panel disposed at the upper portion of the light emitting devices, the reflector including a first portion under the light emitting device, a second portion outside of the first portion, and a third portion outside of the second portion,
   wherein the first portion of the reflector has a flat surface, the second portion of the reflector is inclined to the third portion from the first portion at a predetermined angle, and the third portion of the reflector has a flat surface parallel to the surface of the first portion,
wherein the third portion is disposed under the first portion so that the second portion is inclined in the lower direction from the first portion to the third portion.

8. The device of claim 7, wherein the light emitting devices include a light emitting diode.

9. The device of claim 7, further comprising a light guide plate above each light emitting device to guide the light emitted from the light emitting devices to the liquid crystal display panel.

10. The device of claim 7, wherein the reflector has a stepped portion at the lower surface of the light emitting devices.

* * * * *